US007343258B2

United States Patent
Huang et al.

(10) Patent No.: US 7,343,258 B2
(45) Date of Patent: Mar. 11, 2008

(54) FUSION TEMPERATURE CALIBRATION

(75) Inventors: Wei-Ping Huang, Spanga (SE); Kjell Ahlstedt, Jarfalla (SE); Ellef Hersoug, Stockholm (SE); Christian Gottlicher Palafox, New York, NY (US)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 10/536,414

(22) PCT Filed: Apr. 2, 2003

(86) PCT No.: PCT/SE03/00529
§ 371 (c)(1), (2), (4) Date: May 25, 2005

(87) PCT Pub. No.: WO03/096088
PCT Pub. Date: Nov. 20, 2003

(65) Prior Publication Data
US 2006/0074516 A1    Apr. 6, 2006

Related U.S. Application Data

(60) Provisional application No. 60/431,035, filed on Dec. 5, 2002.

(51) Int. Cl.
*G06F 19/00* (2006.01)
*G02B 6/255* (2006.01)
(52) U.S. Cl. .................. 702/99; 219/383; 374/160; 385/97
(58) Field of Classification Search .......... 702/85, 702/99; 385/97, 147; 374/160, 161; 219/383; 65/377; 700/212
See application file for complete search history.

(56) References Cited

U.S. PATENT DOCUMENTS 5,772,327 A * 6/1998 Zheng .................. 374/160
6,294,760 B1 * 9/2001 Inoue et al. ............ 219/383

FOREIGN PATENT DOCUMENTS

| EP | 0583155 A1 | 2/1994 |
| EP | 0740172 A1 | 4/1996 |
| EP | 1039319 A2 | 9/2000 |

OTHER PUBLICATIONS

Swedish Patent Office, International Search Report for PCT/SE03/00529, dated Aug. 22, 2003.

* cited by examiner

*Primary Examiner*—John Barlow
*Assistant Examiner*—John Le
(74) *Attorney, Agent, or Firm*—Roger S. Burleigh

(57) ABSTRACT

The present invention relates to a method for accurately calibrating fusion temperature in optical fiber splicing. With assistance of direct arc-recentering technique, two optical fibers are spliced and then continuously heated with a post-fusion process. In the process, the fusion temperature is automatically determined in terms of effective fusion currents, which is done by real-time monitoring the fusion time dependence of cladding diameter reduction. In comparison with model calculations, variations of fusion temperature caused by changes of electrode condition and operating environment, e.g. altitude, temperature and humidity are derived. To recover the optimal fusion temperature in various fusion processes, the calibrating results are automatically invoked to compensate fusion currents.

5 Claims, 16 Drawing Sheets

FUSION TEMPERATURE CALIBRATION

This application claims priority from PCT/SE03/00529 filed on Apr. 2, 2003, which claims benefit of U.S. Application No. 60/431,035 filed on Dec. 5, 2002.

TECHNICAL FIELD OF THE INVENTION

The present invention relates to methods and arrangements for calibration of fusion temperature in an optical fiber splicing device.

DESCRIPTION OF RELATED ART

It is well known that fusion temperature in a splicer will be varied due to significant changes of operating environment, e.g. changes of altitude, temperature and humidity etc. For the well-defined operating environment, the fusion temperature can still be varied because of changes in electrode conditions, e.g. wear of the electrodes, dynamic changes of silica layers deposited on the electrodes. Even for the same settings of fusion parameters (e.g. fusion currents and fusion time etc.), finite tolerance in manufacture processes of splicers may also result in different fusion temperature among identical type of splicers. As a consequence of fusion temperature variation, inconsistent splicing results (e.g. in term of splice losses, splice strength and loss estimation etc.) will occur in a particular splicer and/or among identical splicers.

During past decades, many scientists have devoted their efforts to study and model the impacts of different factors in splicing processes, e.g. the operating environment, the electrode conditions and the machinery tolerances etc. Up to the date, suitable models have not been seen for commercial splicers, which could be attributed to primarily technical reasons and rather complicated nature of the involved splicing processes. Thus, instead of modeling individual factors, different calibrating processes for deriving the integrated effect of these factors have been proposed and developed, which involve directly or indirectly measuring discharge heat energy and/or fusion temperature. That is the so-called arc-test or the arc-check process.

One of frequently referred methods is the fiber-meltback method disclosed by Sumitomo's patent JP5150132 and Fujikura's U.S. Pat. No. 5,009,513. With the method, the fiber ends are positioned with a known gap distance and then heated by the electrical arc. The heating process causes a retraction of fiber ends and results in an increase of gap distance. By measuring the amount of change in the gap distance, the discharge heat energy can be determined. Unfortunately, it is found that, the retraction of fiber ends is strongly affected by the degree of arc-spread (e.g. changes in the effective width of arc intensity profile). The method therefore does not give the high accuracy of calibration.

Another type of methods are the offset-splicing methods (cf. Ericsson's U.S. Pat. No. 5,772,327; Fujikura's U.S. Pat. No. 4,948,412 and U.S. Pat. No. 6,294,760). With these methods, two fibers are spliced with an initial core/cladding axial offset. Due to surface tension effects, a reduction of the axial offset will occur during splicing processes. By measuring the relative reduction of the offset, the discharge heat energy is determined. Though the methods are less sensitive to the degree of arc-spread, the process could be however strongly affected by the "arc-walk", i.e. the spatial movement of arc intensity profile due to dynamic changes of silica layers deposited on the electrodes. The arc-walk changes the amount of energy deposited on the offset-splicing point, which in turn results in the inconsistent results from one calibration to the other.

The other methods, such as the method of barometric sensor (cf. Fujikura's patents, EP583155 and EP504519) and the method of electrode-impedance-detection (cf. Furukawa's patent, JP9005559), rely mainly on the hardware construction in the splicer. Thus, the method is not applicable to compensate differences in fusion currents among identical splicers due to finite tolerances of hardware components. And, the reliability of these methods may also suffer from those components having high sensitivity to operating environment.

SUMMARY OF THE INVENTION

The present invention relates to problems how to develop methods that can provide high reliability and high accuracy of calibrating fusion temperature in an optical fiber splicing device, without drawbacks of existing techniques wherein outer circumstances not are taken into full account.

An object of the invention is to establish a reliable calibration method.

The problem is solved by the invention by a method for fusion temperature calibration where changes in altitude and arc-spread are considered.

More in detail the problem is solved by the invention by a method for calibrating fusion temperature in an optical fiber splicing device wherein fusion currents to an electrical arc that is heating the fiber splicing, are compensated in terms of altitude where the calibration is performed. The fusion temperature is determined based on real-time detecting of a reduction of cladding diameter of the warm-fiber positioned at the center of the electrical arc. The fusion temperature determination is used to calculate new currents needed for replacing values of expected fusion currents in various splicing processes.

An advantage with the invention is that the method according to the invention provides high reliability and high accuracy of calibration.

The invention will now be described more in detail with the aid of preferred embodiments in connection with the enclosed drawings.

DETAILED DESCRIPTION OF EMBODIMENTS

When an optical fiber is heated by electrical arc, temperature in the center of fusion area is over 2000° C. In such a high temperature, the fiber in the fusion area is liquidized. Since the viscosity of liquid decreases with increasing temperature, a temperature dependence of viscosity distribution will be created in the fusion area, which results in tangential forces at the vicinity of cladding and/or inside of the fiber. As a consequence, the reduction of cladding diameter at the center of electrical arc will occur during an extended fusion time. The reduction area of cladding will be expanded with increasing fusion time due to the effects of viscosity and surface tension. Finally, the fiber will get broken. The progress of this unique phenomenon is schematically shown in FIG. 1 with warm-fiber images.

During experiments, we discovered that the total fusion time at which the significant reduction of cladding diameter occurs can be strongly correlated to the amount of arc discharge energy deposited on the fiber. In other words, for a well-defined target fusion current (i.e. the current used in the calibrating processes), variations of fusion temperature can be derived by measuring the amount of increasing/decreasing fusion time defined by the relative reduction of cladding diameter.

Figure 1:
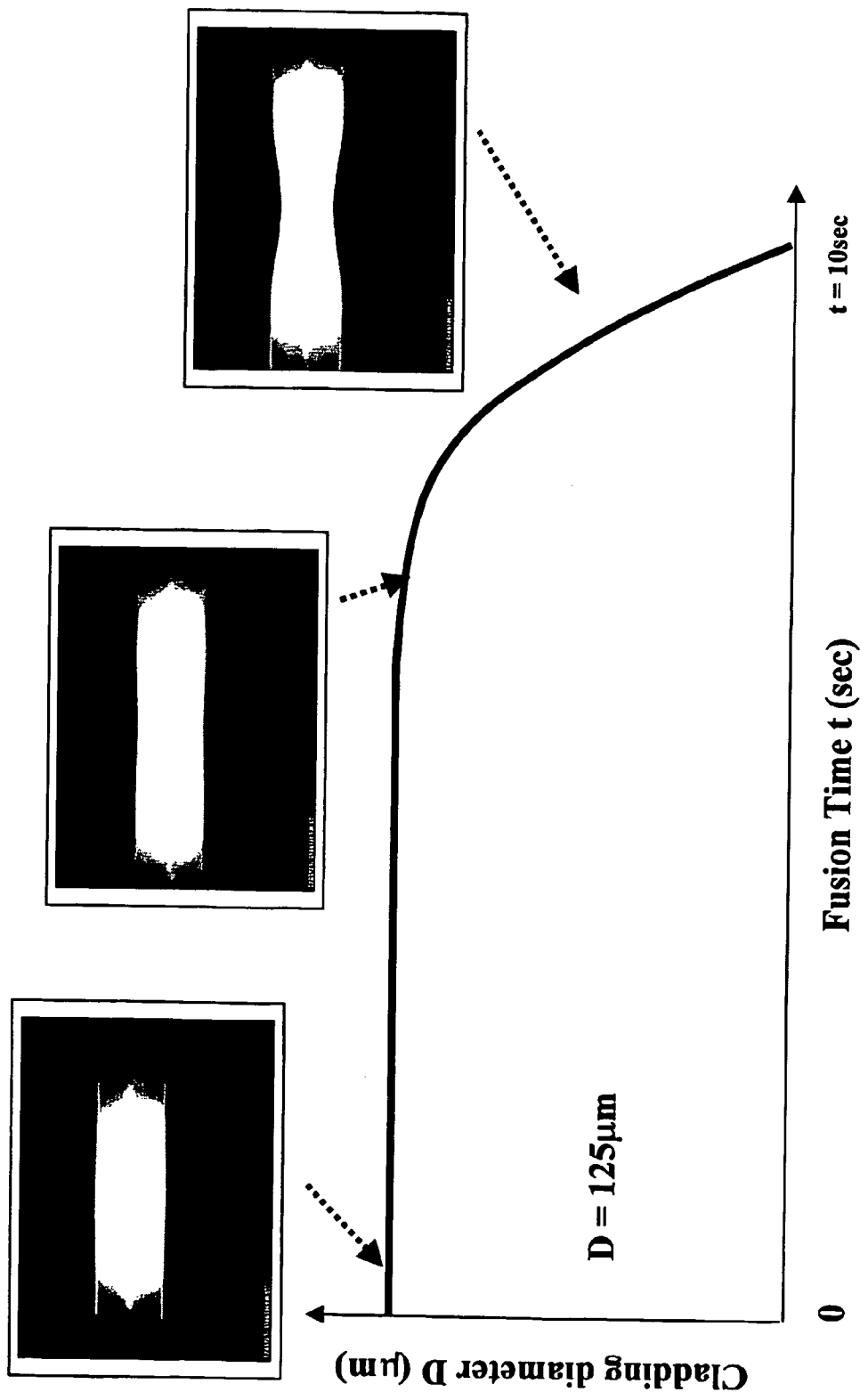
FIG. 1 discloses a schematic diagram showing fusion time dependence of cladding diameter reduction.

In order to make use of the unique phenomenon shown in FIG. 1 to formulate the complete processes of fusion temperature calibration, two optical fibers (typically, SMF28 fibers) are spliced together and then continuously heated by a post-fusion process with a well-defined target current. In the post-fusion process (i.e. the calibrating process), two warm-images are taken from two perpendicular directions and the corresponding diameter of warm-fiber is calculated by averaging the measured values from two perpendicular directions. This imaging process is periodically repeated with a cycle time of 150 ms and the reduction of warm-fiber diameter is also simultaneously monitored. When the reduction of diameter reaches the threshold (e.g. 95% of the original diameter), the heating process is terminated and the accumulated total fusion time is counted. The total fusion time is thus transferred to the effective fusion current that presents the fusion temperature and/or discharge heat energy. That is the so-called real-time monitoring RTM.

We have to point out that the pre-process of making an ordinary splice is not necessary to be part of the calibrating process. In principle, the calibrating process requests only to heat up a bare fiber (e.g. a window-stripped fiber). In the experiments, it is observed however that the window-stripped fiber could be bent during fusion processes due to the initial offset between the left and right fiber-holder system at transverse (x, y) directions. The bending could induce an error in the measurement of warm-fiber diameters, which in turn degrades the accuracy of calibration.

Therefore, in the present invention, the pre-process of making an ordinary splice is introduced to create an automatic self-alignment of the fiber-holder system to remove the offset. Alternatively, the pre-process for automatically aligning the fiber-holder system could also be done with help of the built-in position sensors at transverse (x, y) directions in the splicer.

By carefully studying the unique phenomenon shown in FIG. 1, the correlations between the total fusion time t and the target currents I for the well-defined reduction of cladding diameter are experimentally determined. Taking Ericsson FSU15 splicer as an example, in FIG. 2, t is plotted as a function of I (here, I=8.5, 9, 9.5, 10, 10.5, 11, 11.5 mA). Where, t is defined by the relative reduction of cladding diameter $\Delta$ in the warm-fiber. Here, $\Delta=1-D/D_0=5\%$ sets the threshold to terminate the calibrating processes. The $D_0$ and D are the original and the reduced cladding diameters of the warm-fiber measured during the RTM process.

Figure 2:
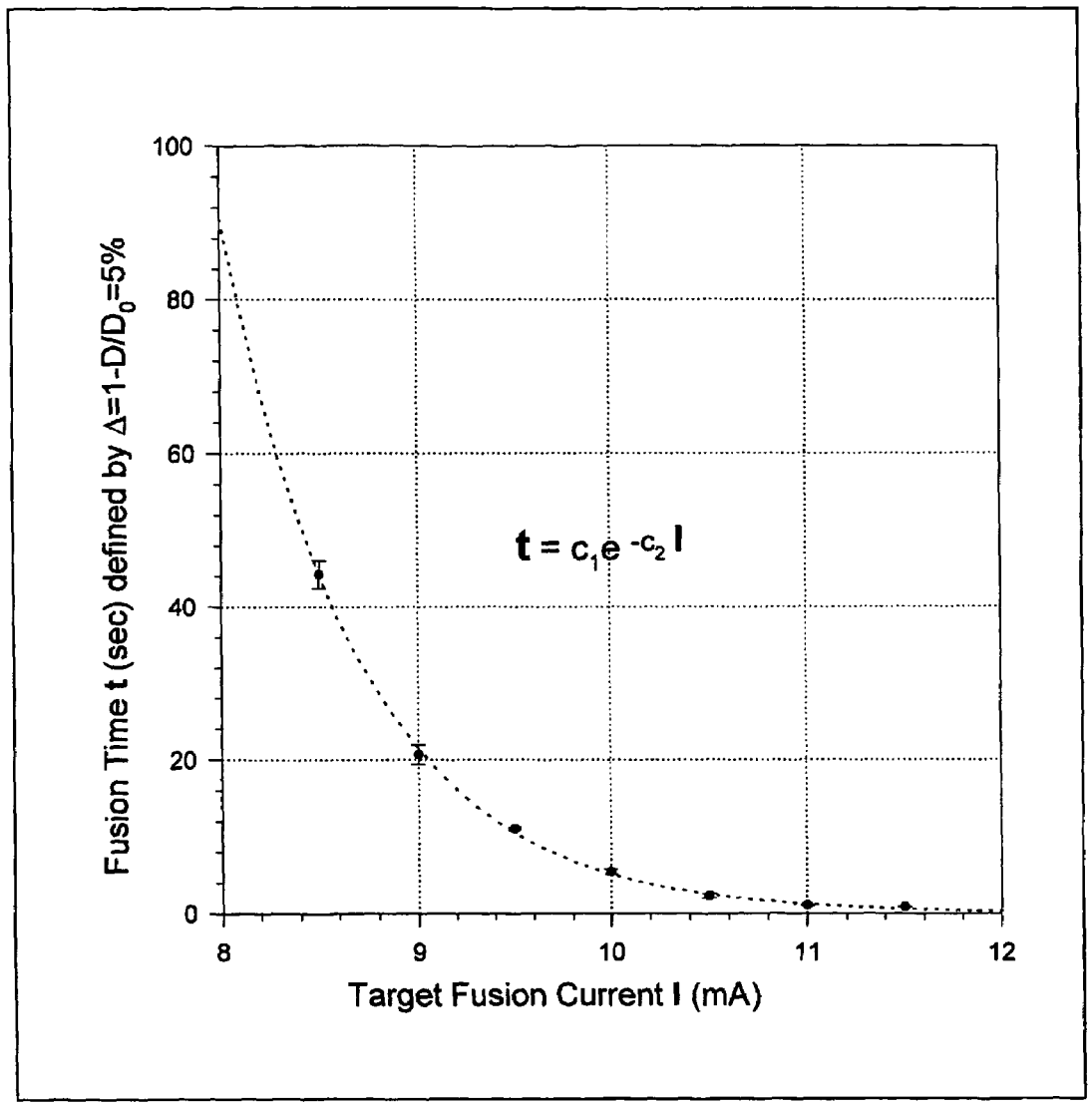
FIG. 2 discloses a diagram showing the correlation between the target fusion current and the fusion time defined by relative reduction of cladding diameter.

The experimental data (solid circles) shown in FIG. 2 are taken under the conditions of "quasi-new electrodes" (e.g. electrodes being used for 20 normal splices, typically). Each data point presents the averaging values of 9 splices obtained from 3 identical splicers. The error bar shown in FIG. 2 is the standard deviation. By carefully fitting the data, we found that the relation between t and I can be expressed by a single exponential decay function (see the dashed line in FIG. 2), that is:

$$t = c_1 e^{-c_2 I} \quad (1)$$

Where, $c_1$ and $c_2$ are fitting constants.

With the help of equation (1), the variations of fusion temperature due to the changes of operating environment, the changes of electrodes conditions and the machinery tolerances can be calibrated. Let's assume that, for a given target fusion current $I_{c,1}$, the expected fusion time according to equation (1) is $t_1$. After executing the calibrating processes, one gets the measured fusion time $t_2$. Thus, the effective fusion current $I_{c,2}$ can be calculated according to equation (1). One gets the amount of fusion current needed for compensation:

$$\Delta I_c = I_{c,1} - I_{c,2} \quad (2)$$

If one assumes that the compensating current $\Delta I_c$ derived from a given target current $I_{c,1}$ can be applied to all fusion currents $I_i$ (i=1,2 ...) in splicing processes, the new currents $I_{New,i}$ need for replacing values of fusion currents $I_i$ in various splicing processes should be:

$$I_{NEW,i} = I_i + \Delta I_c \quad i=1,2,\ldots \quad (3)$$

The remaining questions are how to select a suitable target current $I_{c,1}$ for the calibration and what amount of the error could be induced according to the assumption given in the equation (3).

It is clear that, the optimal main fusion current $I_{Opt}$, in principle, should be used as the target current for calibrating processes since the $I_{Opt}$ is one of the most important parameters for achieving the lowest splice losses. Due to practical reasons, however, one may prefer to perform the calibration processes with a different target current $I_{c,1}$ instead of $I_{Opt}$ (i.e. $I_{Opt} \neq I_{c,1}$). Let's take Ericsson FSU15 splicer as an example. If one sets $I_{c,1} = I_{Opt} = 8$ mA as the target fusion current, the expected time $t_1$ for calibration process will be significantly long, $t_1 \approx 91$ seconds. It is well known that long fusion time can cause the problem of arc instability. To avoid the problem of arc instability, one may need to increase $I_{c,1}$ to some extend, e.g. using $I_{c,1} = 9.5$ MA (the corresponding $t_1 \approx 11$ sec) to speed up the calibrating process. Thus, it is interesting to estimate the calibrating error if one uses different target currents for the calibration.

From basic physics, one learns that fusion temperature T is proportional to the arc discharge energy or the power consumption during fusion processes, that is:

$$T \propto VI = (AP/n_e)I^2 \quad (4)$$

Where, V is the fusion voltage applied on the electrodes and $n_e$ is the electron density in the arc, P is the air pressure, and A is a proportional constant. For a well-defined altitude, both P and $n_e$ are constants. Therefore, the equation (4) can be rewritten by introducing another constant K:

$$T = KI^2 \quad (5)$$

Assuming that the compensating current is $\Delta I_c$, and temperature variations for the optimal main fusion temperature and the target fusion temperature are: $\Delta T_{Opt}$ and $\Delta T_1$ ($T_{Opt} \neq T_1$), respectively. One gets:

$$T_{Opt} + \Delta T_{Opt} = K(I_{Opt} + \Delta I_c)^2 \quad (6)$$

$$T_1 + \Delta T_1 = K(I_{c,1} + \Delta I_c)^2 \quad (7)$$

Since $\Delta I_c^2 \ll I_{Opt}^2$ and $\Delta I_c^2 \ll I_{c,1}^2$, the equations (6)-(7) can be approximated by:

$$T_{Opt} + \Delta T_{Opt} \approx K(I_{Opt}^2 + 2I_{Opt}\Delta I_c) \quad (8)$$

$$T_1 + \Delta T_1 \approx K(I_{c,1}^2 + 2I_{c,1}\Delta I_c) \quad (9)$$

Inserting the equation (5) into (8) and (9), one gets:

$$\Delta T_{Opt} = 2KI_{Opt}\Delta I_c \quad (10)$$

$$\Delta T_1 = 2KI_{c,1}\Delta I_c \quad (11)$$

That is:

$$\Delta T_{Opt} = (I_{Opt}/I_{c,1})\Delta T_1 \quad (12)$$

Assuming the offset current between $I_{Opt}$ and $I_{c,1}$ is $\Delta I_{Off}$ (i.e. $\Delta I_{Off} = I_{c,1} - I_{Opt}$), the error $\delta_{Err}$ in fusion temperature calibration due to the offset current $\Delta I_{Off}$ can be estimated by:

$$\Delta T_{Opt}/\Delta T_1 = (1 - \delta_{Err}) \quad (13)$$

$$\delta_{Err} = \Delta I_{Off}/I_{c,1} \quad (14)$$

If $(I_{c,1} - I_{Opt}) \geq 0$, one gets $\Delta T_{Opt}/\Delta T_1 \leq 1$, which means that one overestimates the fusion temperature with the error of $\delta_{Err}$. On the other hand, if $(I_{c,1} - I_{Opt}) < 0$, one get $\Delta T_{Opt}/\Delta T_1 > 1$, meaning the underestimate of the fusion temperature by $\delta_{Err}$.

Taking derivative in the equation (5), one gets:

$$\Delta T \approx 2KI\Delta I \quad (15)$$

Insetting (5) into (15), one gets:

$$\Delta T/T \approx 2\Delta I/I \quad (16)$$

The equation (16) shows that the relative change of fusion current is a factor of two smaller than that of fusion temperature. Therefore, one could estimate the error due to $\Delta I_{Off,i} = I_{c,1} - I_i$ for different fusion currents $I_i$ (i=1,2 ...) in various splicing processes by:

$$\delta_{Err,i}(I_i) = 0.5(I_{c,1} - I_i)/I_{c,1} \quad (17)$$

In order to make an accurate calibration, we introduce an error correction factor $\delta_i$ for compensating the error in the calibrating process. Thus, the equation (3) can be rewritten by:

$$I_{New,i} = I_i + \delta_i \Delta I_c; \quad i=1,2 \ldots \quad (18)$$

$$\delta_i = 1 - \delta_{Err,i} = 1 - 0.5(I_{c,1} - I_i)/I_{c,1} \quad (19)$$

Where, i=1,2 ... is the number of fusion currents needed for compensation. For Ericsson FSU15FI splice (i=1, 2 ... 6), these currents are the pre-fuse current, the gap current, the overlap current, the main current, the pull current and the relax current in various splicing processes.

Furthermore, it is also interesting to check what is the best range for setting the target current $I_{c,1}$ to perform the calibration and what is the estimated accuracy in term of the fusion current compensation.

By close inspection of FIG. 2, one finds that the best range for calibration would be to set $I_{c,1}$ between 9.5~9 mA (the corresponding time will be $t_1 \approx 11$~21 sec). This is because the calibration time in this range is significantly shorter compared to that using the optimal main fusion current ($I_{Opt}$=8 mA, $t_1 \approx 91$ sec), and the calibrating error needed for compensating is also small, about 6%~8% according to the equation (17).

For estimation of accuracy in the process, let's assume that fusion currents are varied by ±0.1 mA in the range $I_{c,1} \approx 9.5$~9.0 mA. According to FIG. 2, one gets the resolving time of about 1.5~3 seconds with the statistic error-bar of about 0.2~1.2 seconds. This implies that the high accuracy calibration better than 0.1 mA could be achieved in the calibrating process.

The concept of the arc recentering was first proposed by W. Huang et. al. (cf. Ericsson's patent WO01/86331). With the concept, warm-images obtained in splicing processes are evaluated to predict positions of arc center for setting the best splicing points in a sequence of splices. In contrast to the previous method of prediction, in the present invention, we extend the concept of the arc recentering to directly reposition fiber ends with respect to the arc-center detected in the pre-fusion process before splicing. That is the so-called direct arc recentering process.

Figure 3:
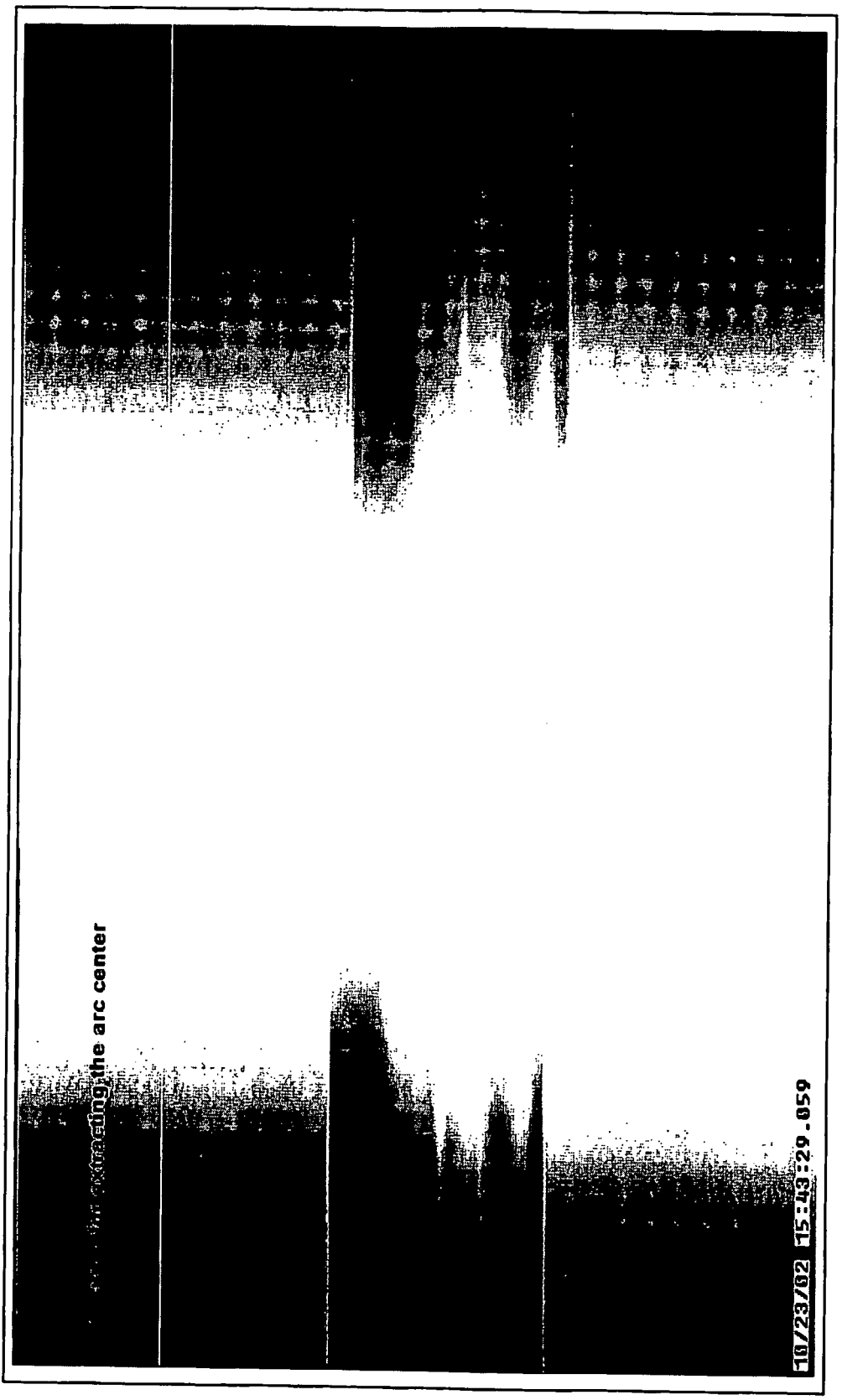
FIG. 3 discloses the warm-image extracted from the pre-fusion process to determine the initial position of arc-center for repositioning of fiber-ends before splicing.

FIG. 3 shows the warm-image extracted from the pre-fusion process that is ordinarily developed for electrically cleaning to remove micro-dusts on the surface of optical fibers. One can see that the thermal light emission from air-discharge in fusion area can be observed by a charge-coupled device (CCD)-camera. Since the light emission is directly correlated to the arc intensity distribution, information on spatial movement of arc before calibration can therefore be obtained by carefully analyzing emitted light intensity distribution in the air-discharge.

Figure 4:
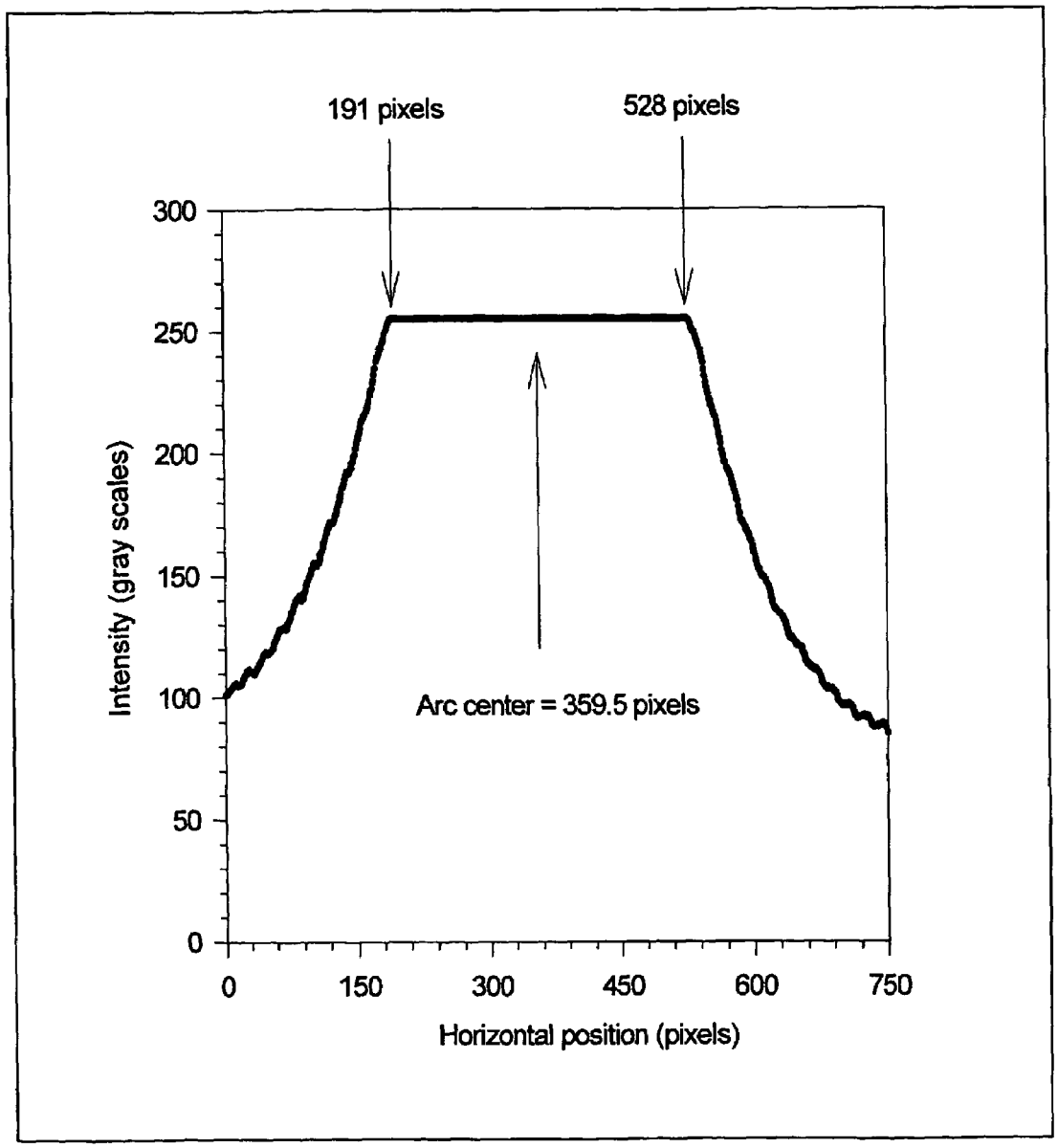
FIG. 4 discloses light intensity profile extracted from warm-image at the position of fine-line indicated in FIG. 3.

The light intensity profile of air-discharge was extracted from the warm-image at the position of the fine-line indicated in FIG. 3. The profile is plotted in FIG. 4. With help of warm-image analysing techniques (it will be discussed in the forthcoming section), the initial position of arc center $X_0$ (here, $X_0 \approx 359.5$ pixels) is determined. The positions of left and right fiber ends are thus repositioned with respect to the arc center. Therefore, the arc is re-centered in term of the splicing point, and problems of the arc-spread and the arc-walk in calibrating processes is suppressed.

For an automatic fusion splicer, the CCD-camera together with an imaging processor is used for image analysis. In order to increase the dynamic range of imaging system, the CCD-camera usually has a built-in auto-gain control (AGC) function defined by control parameters, e.g. the integration time (IT) and the gain (G) of pre-amplifier.

When the electrical arc heats the fiber, the light emission from solid plasma excitation inside fiber can also be observed by the CCD-camera. The light emission spectrum covers a wide range from UV to infrared. The CCD-camera responds mostly the visible light. And, the light intensity distribution obtained from the CCD-camera depends strongly on the CCD-settings (e.g. IT and G).

Figure 5A:
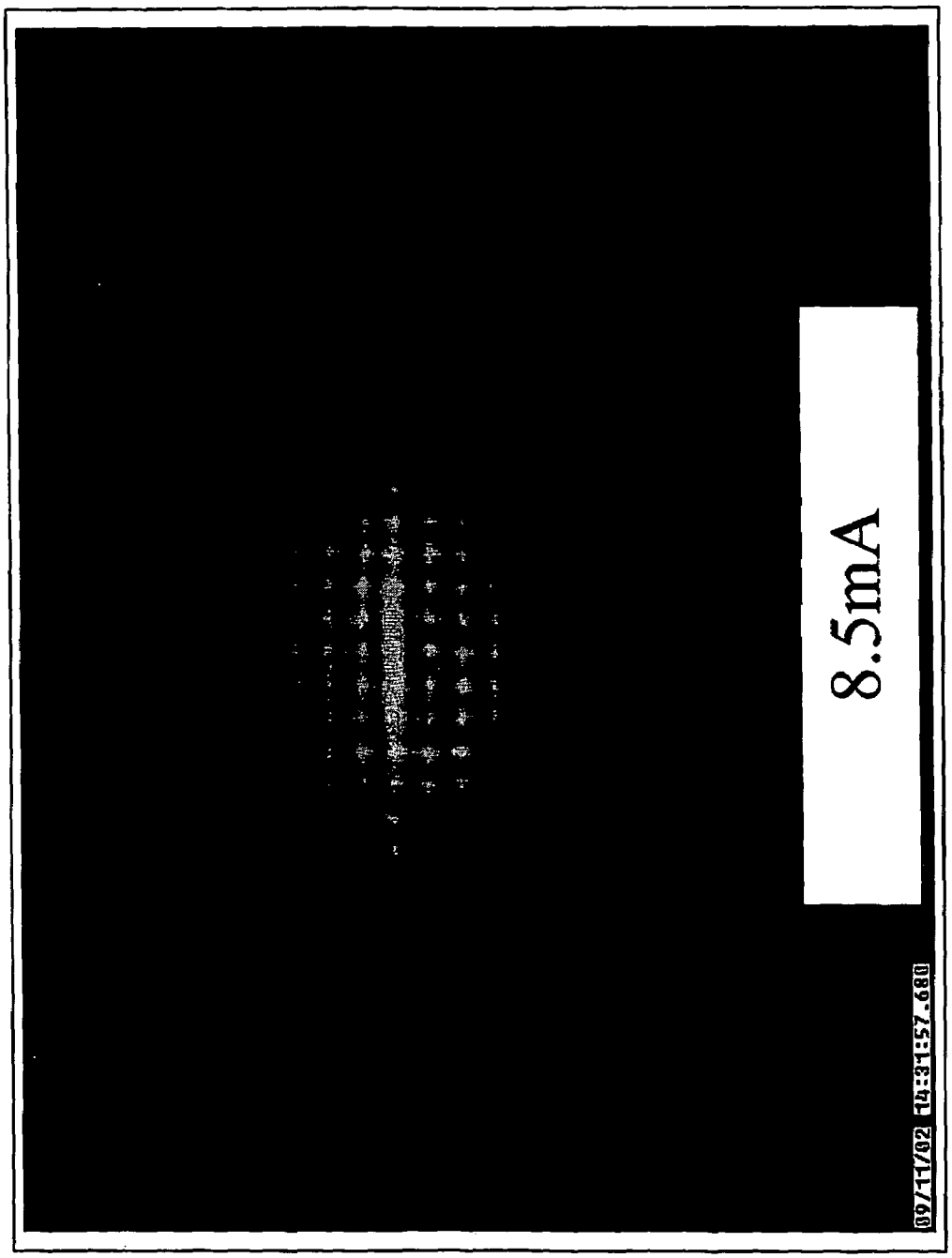
FIG. 5a-5c disclose a comparison of CCD-camera saturation for different target fusion currents.
Figure 5B:
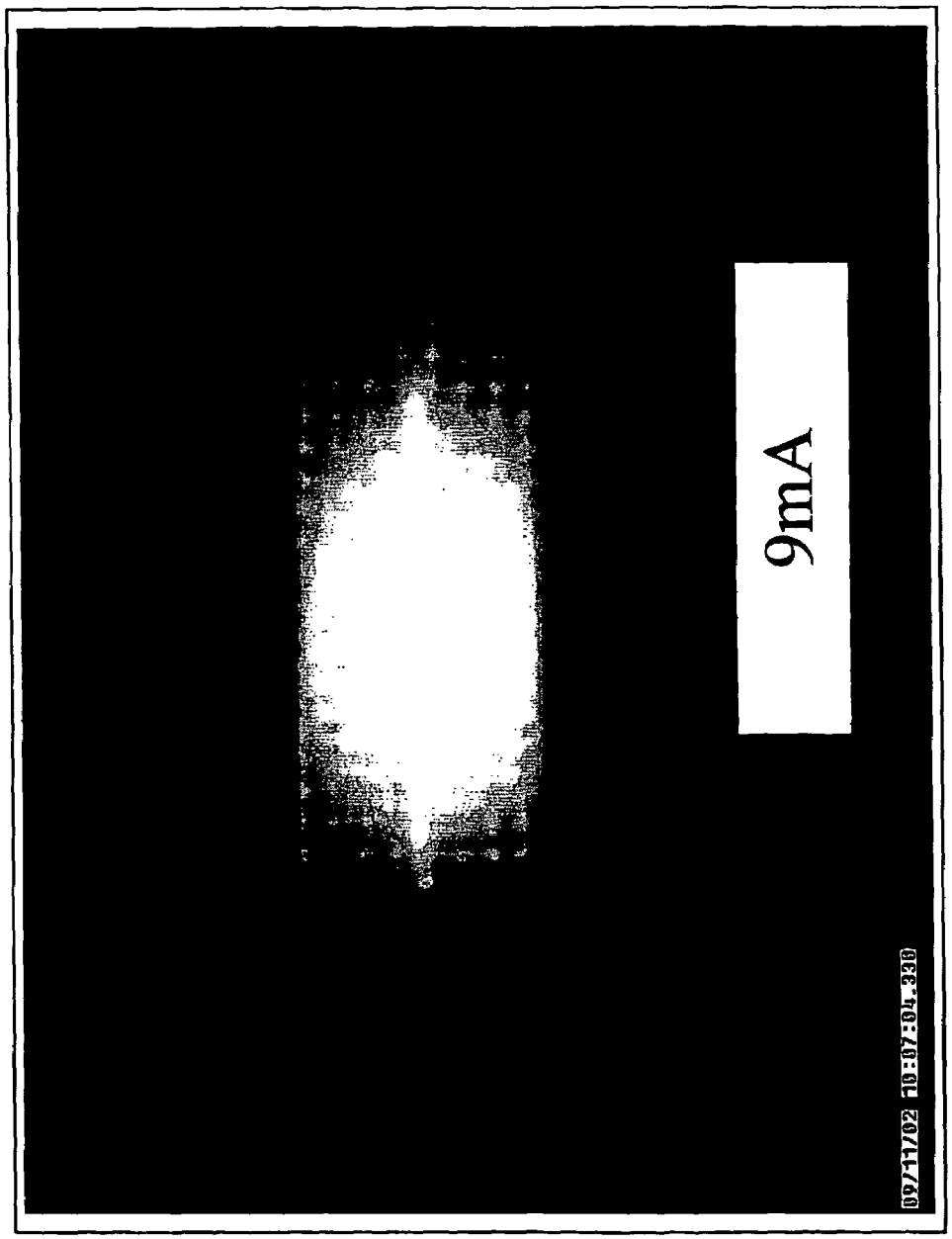
Figure 5C:
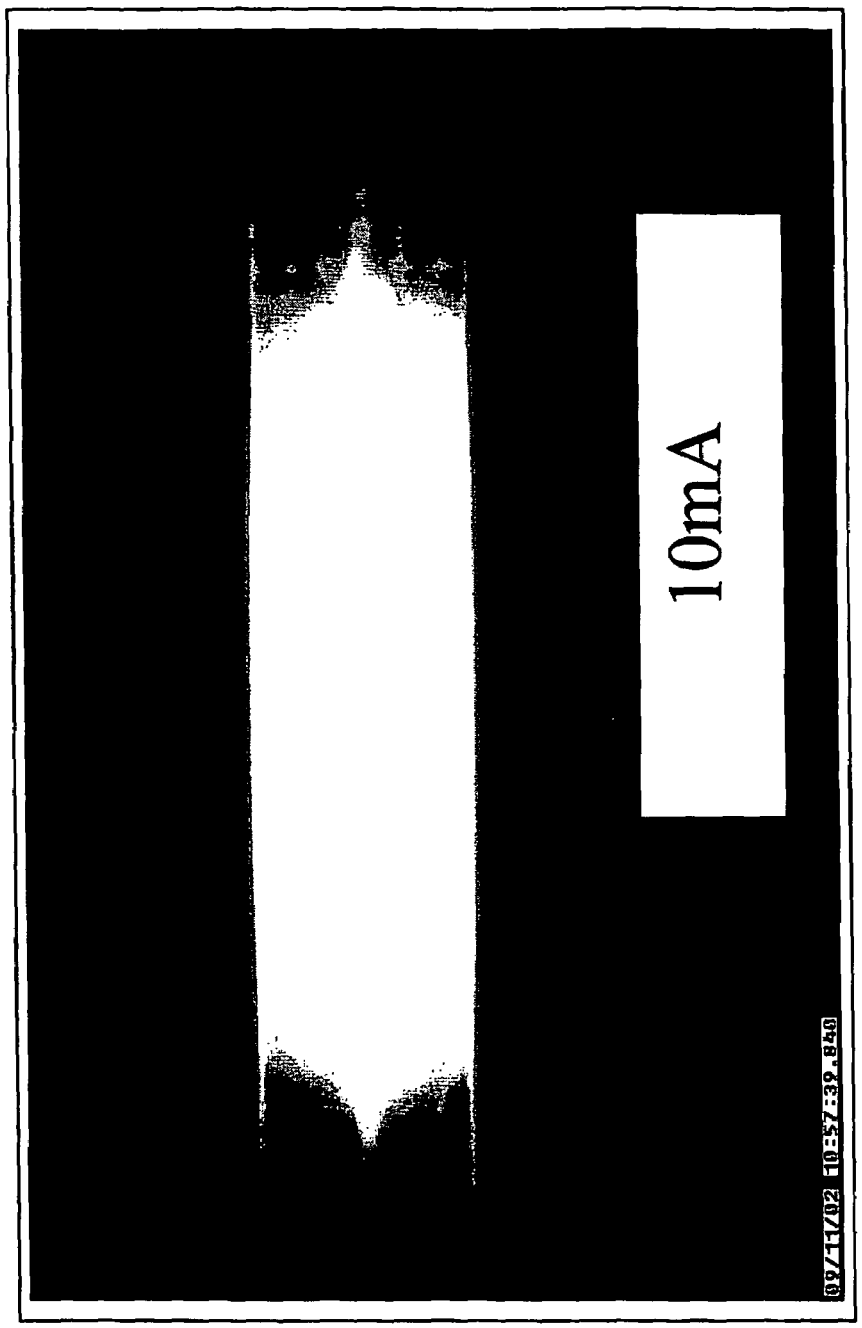

FIG. 5 shows a typical example of warm-images obtained by the CCD-camera in the Ericsson FSU15 splicer with fixed CCD-settings (i.e. IT=1/2000 sec and G=5 dB) for different target currents of 8.5 mA, 9 mA and 10 mA, respectively. One can see that, if the fusion current is low (cf. FIG. 5a), the core of the fiber is clearly observed in warm-image (i.e. the white-line in the middle of image). For high fusion currents, a bright zone arises in the warm-images (cf. FIGS. 5b and 5c) and the width of zone increases with increasing the fusion currents, indicating the degree of CCD-camera saturation.

In normal splicing applications, the AGC-function has to be active in order to remove the saturation of CCD-camera so that the information from the fiber-core can be extracted for analyzing splicing results, e.g. estimating splice losses. In the preset application of calibration, however, the most important information having to be extracted from warm-images is the changes of cladding diameter occurring at the arc center rather than the information of the fiber-core.

From FIG. 5c, one finds that, though the information from the core in the fusion area is almost lost, the contrast of light intensity between the cladding and the background is however significantly enhanced compared to that shown in FIG. 5a-5b. This implies that one could intentionally saturate the CCD-camera in the range of interest (e.g. in the range of $I_{c,1}$=8.5~9.5 mA) to enhance the intensity contrast at the cladding edge, which can in turn simplify the process of warm-image analysis. For clarifying the idea, we simulate the digitizing processes of image analysis for FIG. 5c as following.

Figure 6:
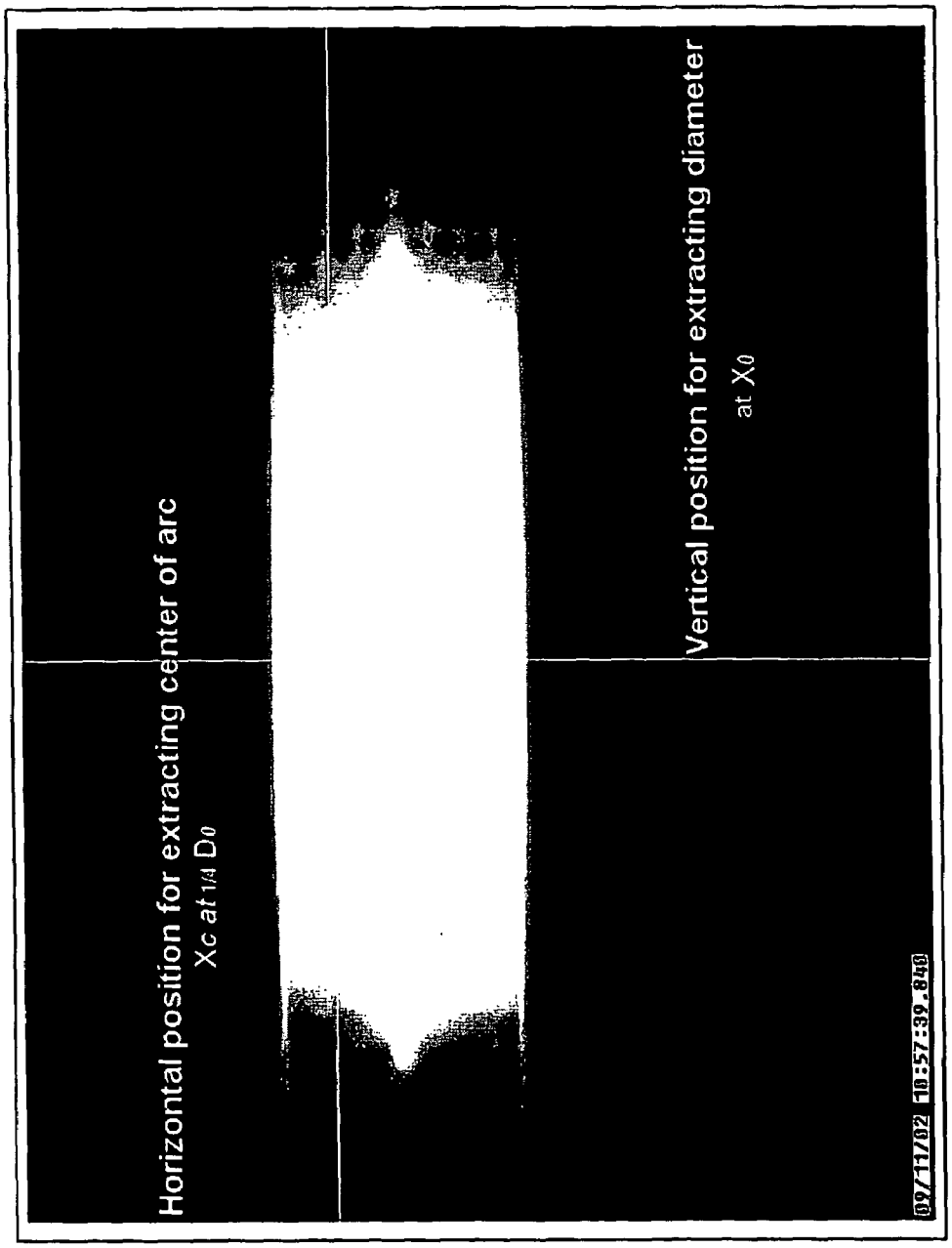
FIG. 6 discloses a warm image obtained using typical CCD-camera settings.

FIG. 6 shows a warm-image obtained using typical CCD-camera settings, e.g. IT=1/2000 sec and G=5 dB. The crossing cursor in FIG. 6 indicates the positions where both the horizontal and the vertical intensity profiles are extracted. The averaging values of "5-pixels-cursor-width" are used throughout in the data extraction from FIG. 6, unless otherwise specified.

Figure 7A:
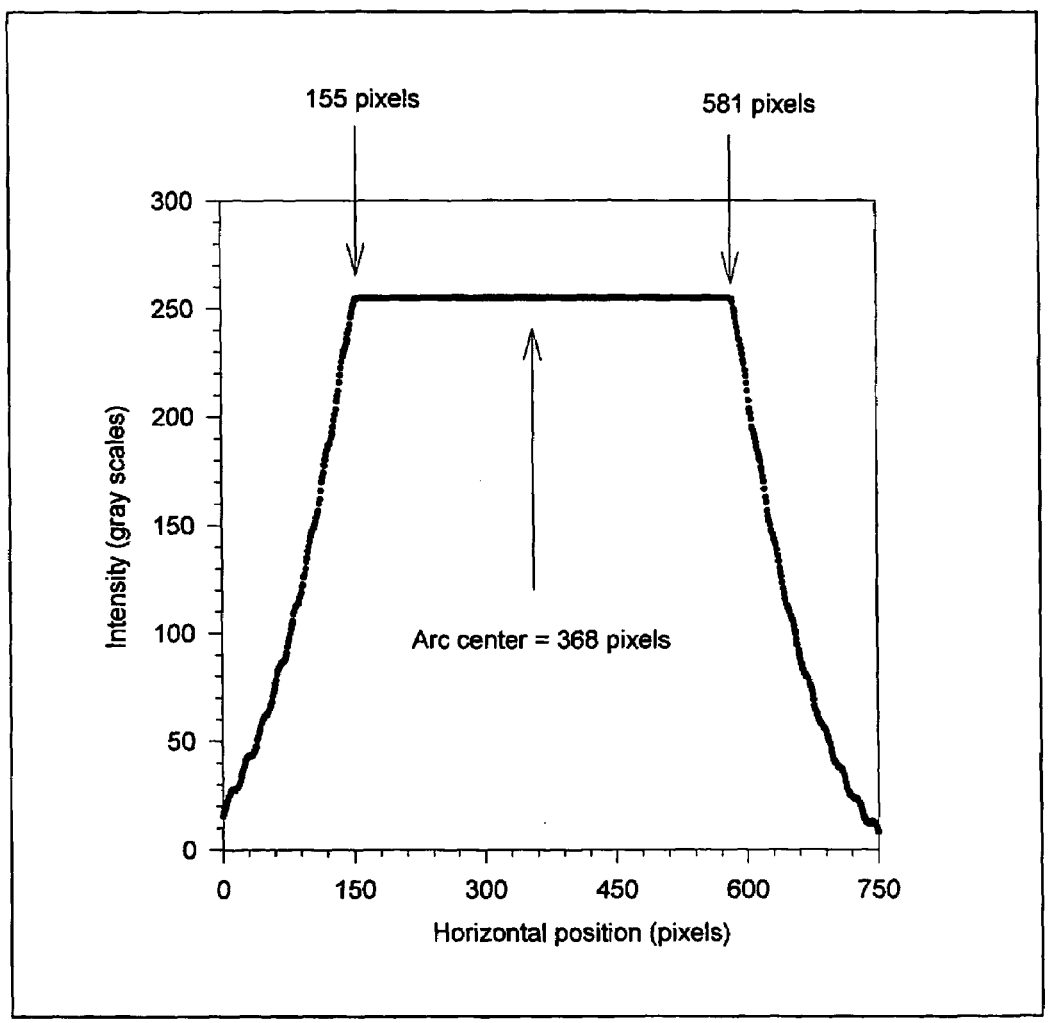
FIG. 7a-7d disclose intensity profiles at both the horizontal and vertical directions, and their analysis.

In contrast to the measurement of initial arc-center $X_0$, the positions of arc-center $X_c$ during calibration are extracted using the light emission from the fiber instead of from the air-discharge. The position of the arc-center $X_c$ is determined at the position of about ¼ width of the warm-fiber shown by the crossing-cursor at the horizontal direction in FIG. 6. Due to the CCD-saturation (the saturation threshold is 255 gray scales in this case), the intensity distribution shows a truncated Gaussian profile. Therefore, one could easily derive the width of effective arc area ω=581−155=426 pixels and the position of arc center $X_c$=426/2+155=368 pixels(cf. FIG. 7a).

With the technique of arc-center detection, the arc-walk defined by $\Delta X = X_c - X_0$ can be monitored in real-time (here, the arc-walk is ΔX=368−359.5=8.5 pixels). If significant changes of arc-center positions are found (e.g. $\Delta X \geq 20$ μm) during the calibrating process, a warning is given to the operator. Thus, the technique opens the possibility for the operator to control the calibrating process and redo the calibration. Therefore, the calibration error due to the arc-walk can be further limited.

Figure 7B:
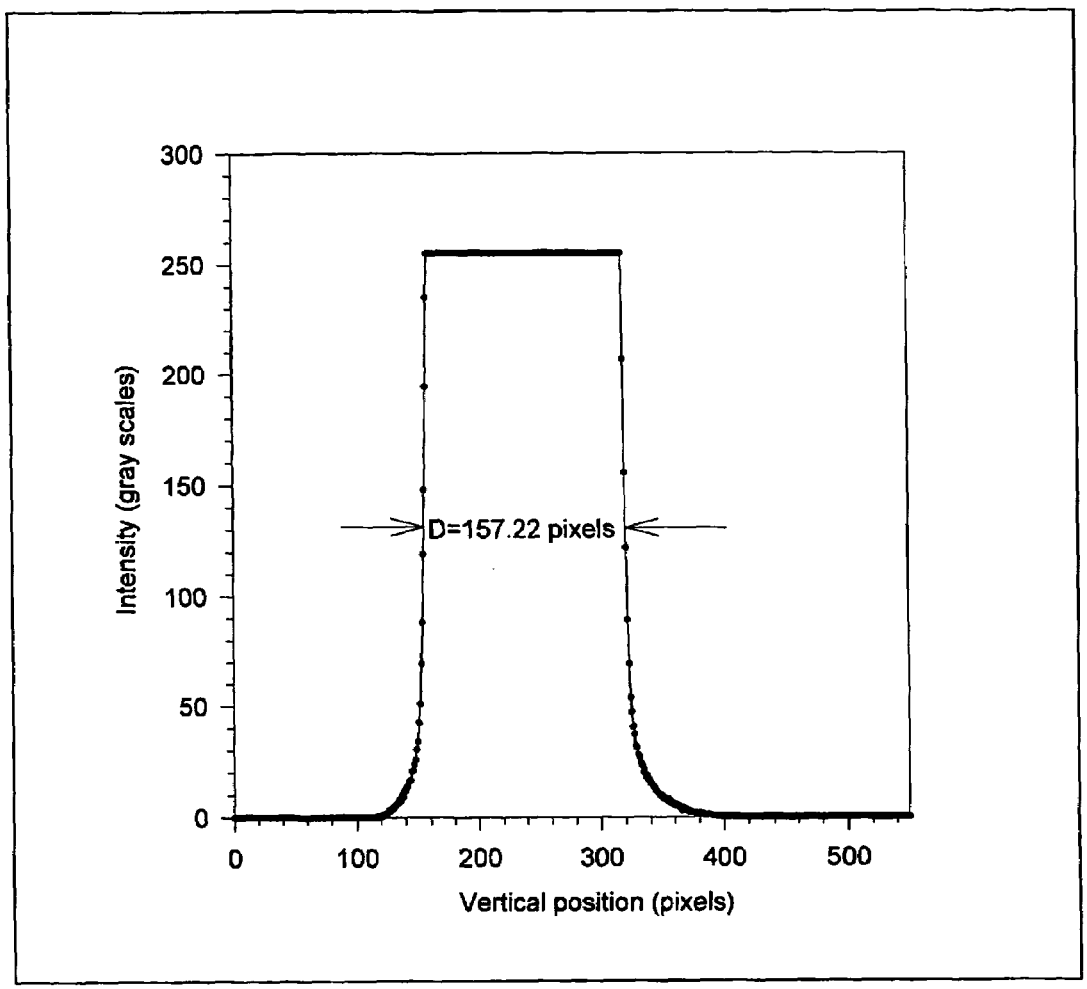

FIG. 7b shows the intensity profile of warm-fiber diameter extracted at the position of initial arc-center ($X_0$=359.5 pixels) shown in FIG. 3. Again, a truncated Gaussian profile is obtained. Obviously, the width of profile D in FIG. 7b represents the cladding diameter of warm-fiber. To accurately determine the cladding diameter D, a more sophisticated method is used, i.e. "the derivatives of profile".

Figure 7C:
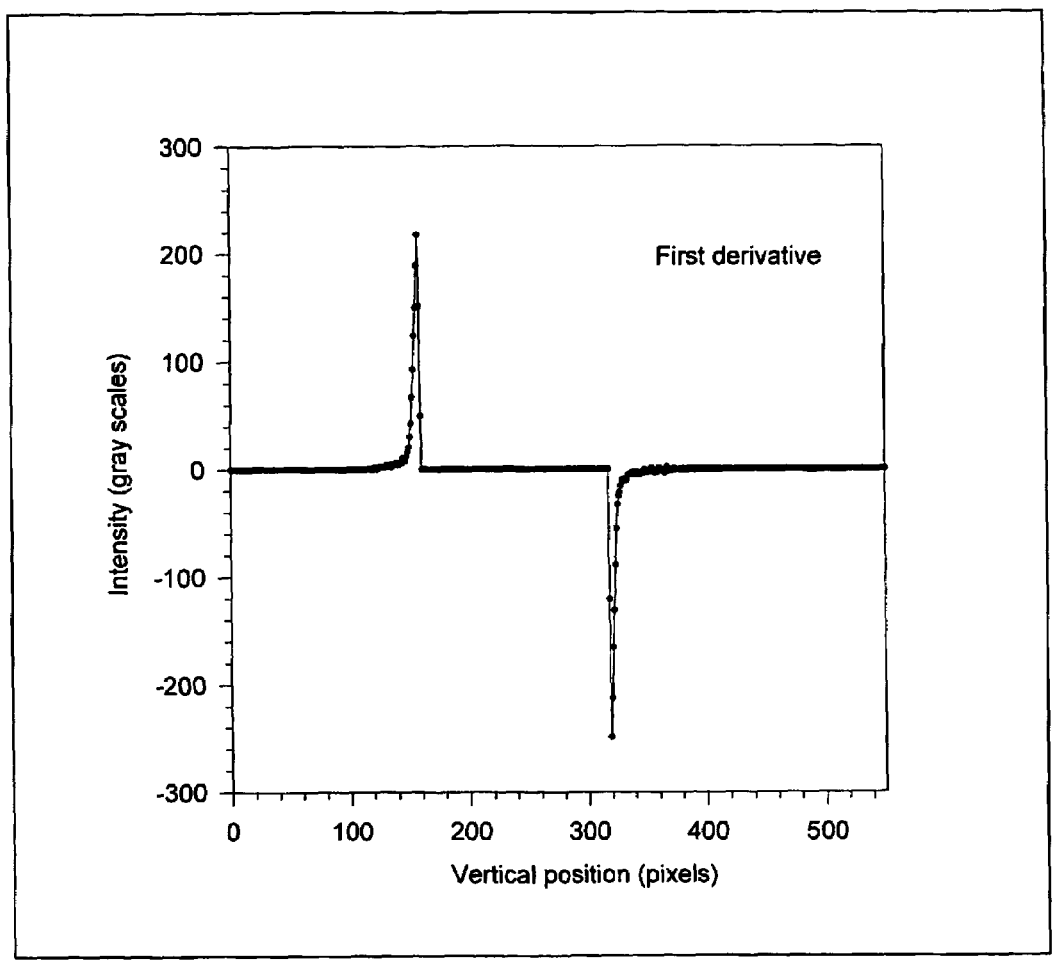
Figure 7D:
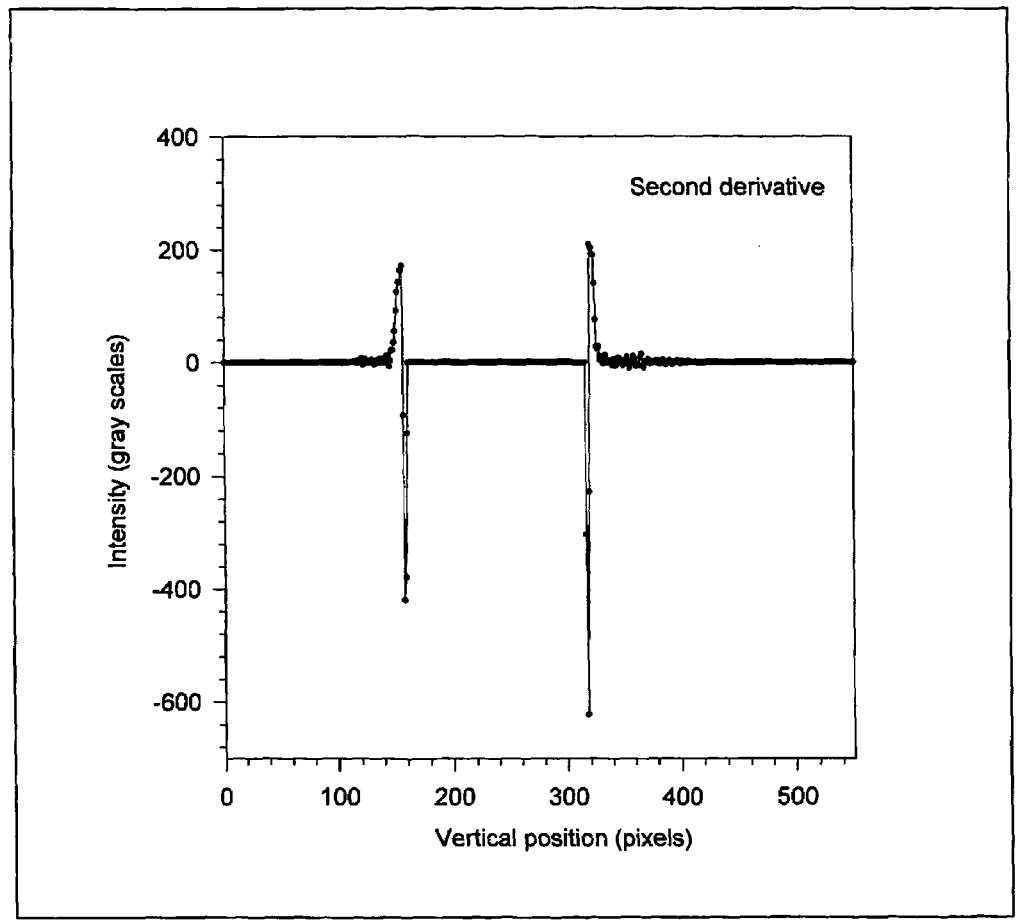

In FIG. 7c and FIG. 7d, we plot the first derivative and second derivative of the cladding diameter profile shown in FIG. 7b. One can see that very clean peaks are pronounced on the top of noise in both cases. The first derivative seems to have relative lower noise, which gives a better profile for analysis. It is clear that the distance between the positive and the negative peaks shown in the FIG. 7c gives the precise measurement of cladding diameter D. There are various ways to calculate the distance. One of simply ways to get the distance is to measure the coordinate difference between the maximum and the minimum values in the profile (e.g. D=157.22 pixels in this case). To limit the impact of noise in the analysis, one could set a threshold (e.g. ±50 gray scales) to filter/remove the noise.

Figure 8:
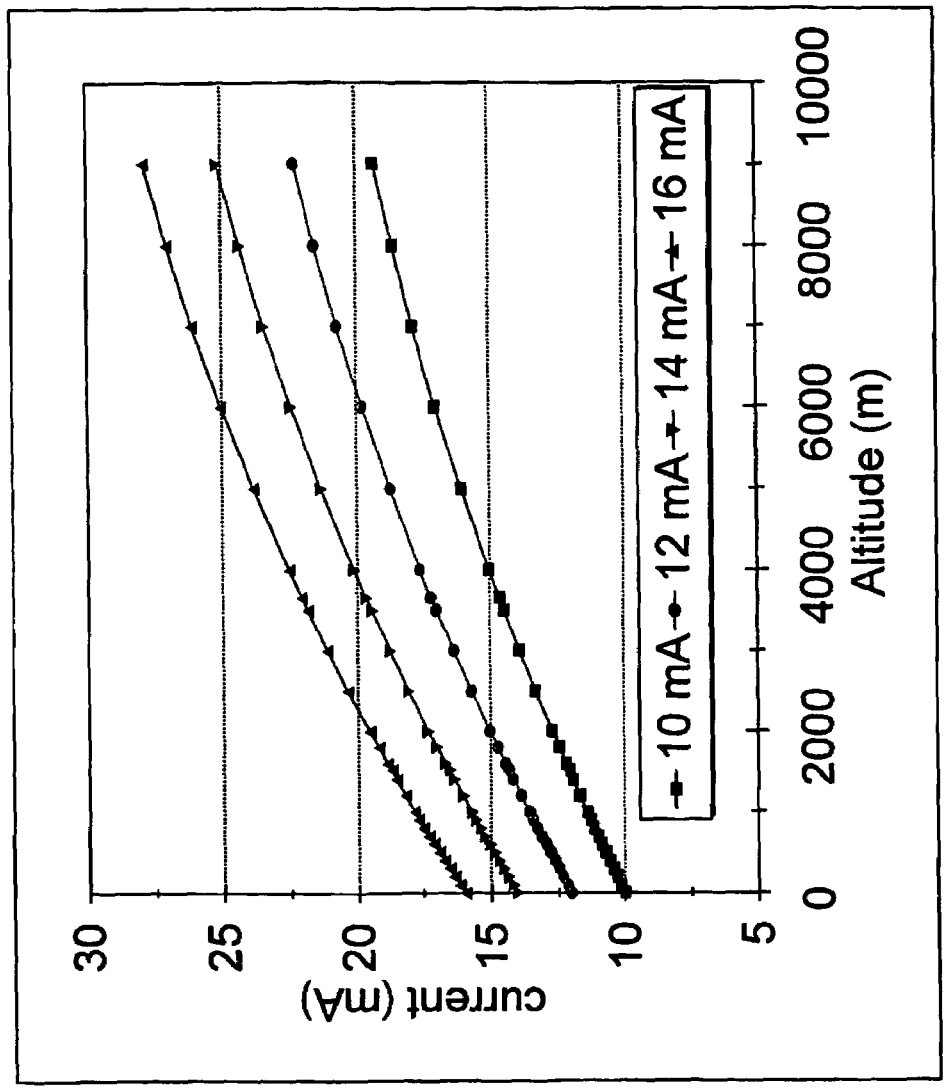
FIG. 8 discloses a diagram showing altitude dependence of fusion currents.

Our previous studies show that the significant changes of altitude can give a very strong impact to the fusion temperature. In FIG. 8, the compensating fusion currents are plotted as a function of the altitude and the original main fusion currents (e.g. 10, 12, 14 and 16 mA). The diagram indicates fusion currents have to be increased about 70% for maintaining the optimal fusion temperature if the altitude is elevated up to 5000 meters.

From the calibrating model shown in FIG. 2, one gives the total calibrating range is approximately ±2 mA. Taking into account of scaling factor in FSU15 splicer, the corresponding range in term of altitude is about ±2000 meters. It implies that the present calibrating process can handle changes in altitude ±1000 meters without problem. However, for a huge elevation of altitude, an additional method for compensating the strong effect of altitude has to be introduced.

By carefully fitting the data shown in FIG. 8, the altitude dependence of fusion current can be expressed by parabolic approximation:

$$I^*_j = h_1 I_j + (h_2 H + h_3 I_j + h_4)^2 + h_5 \tag{20}$$

Where, H is the altitude. $I_j$ (j=1,2, ...) are the fusion currents before compensation. While, $I^*_j$ (j=1,2, ...) are the compensating currents used in the calibrating process. The $h_k$ (k=1,2, ... 5) are fitting parameters.

Thus, the equations (18) and (19) used for compensating fusion currents in various splicing processes should be rewritten to:

$$I_{New, i} = I^*_i + \delta_i \Delta I_c; \; i=1,2 \ldots 6 \tag{21}$$

$$\delta_i = 1 - \delta_{Err,i} = 1 - 0.5(I_{c,1} - I_i)/I_{c,1} \tag{22}$$

$$I^*_i = h_1 I_i + (h_2 H + h_3 I_i + h_4)^2 + h_5 \tag{23}$$

In order to develop an automatic process for altitude compensation, the altitude H has to be detected automatically. There are many methods to get the value of H, e.g. using a built-in commercial altimeter in the splicer, or getting H value just by an educated guess with available knowledge and information.

In the present invention, we propose a method to construct an altimeter by making use of a barometric pressure sensor. According to basic physics (cf. *Concise Encyclopedia of Science and Technology*, McGraw Hill, 3rd edition 1994, in the article *Pressure Altimeter*), the relation between the altitude and the pressure can be expressed by:

$$P = b_1(1 - b_2 H)^{b_3} + b_4 \tag{24}$$

Where P and H are the standard barometric pressure and the altitude, respectively. The equation can be held for the altitude up to 4500 meters above the sea level. The $b_1$, $b_2$, and $b_3$ are the fitting parameters and the $b_4$ is the calibrating constant of the pressure sensor.

Figure 9A:
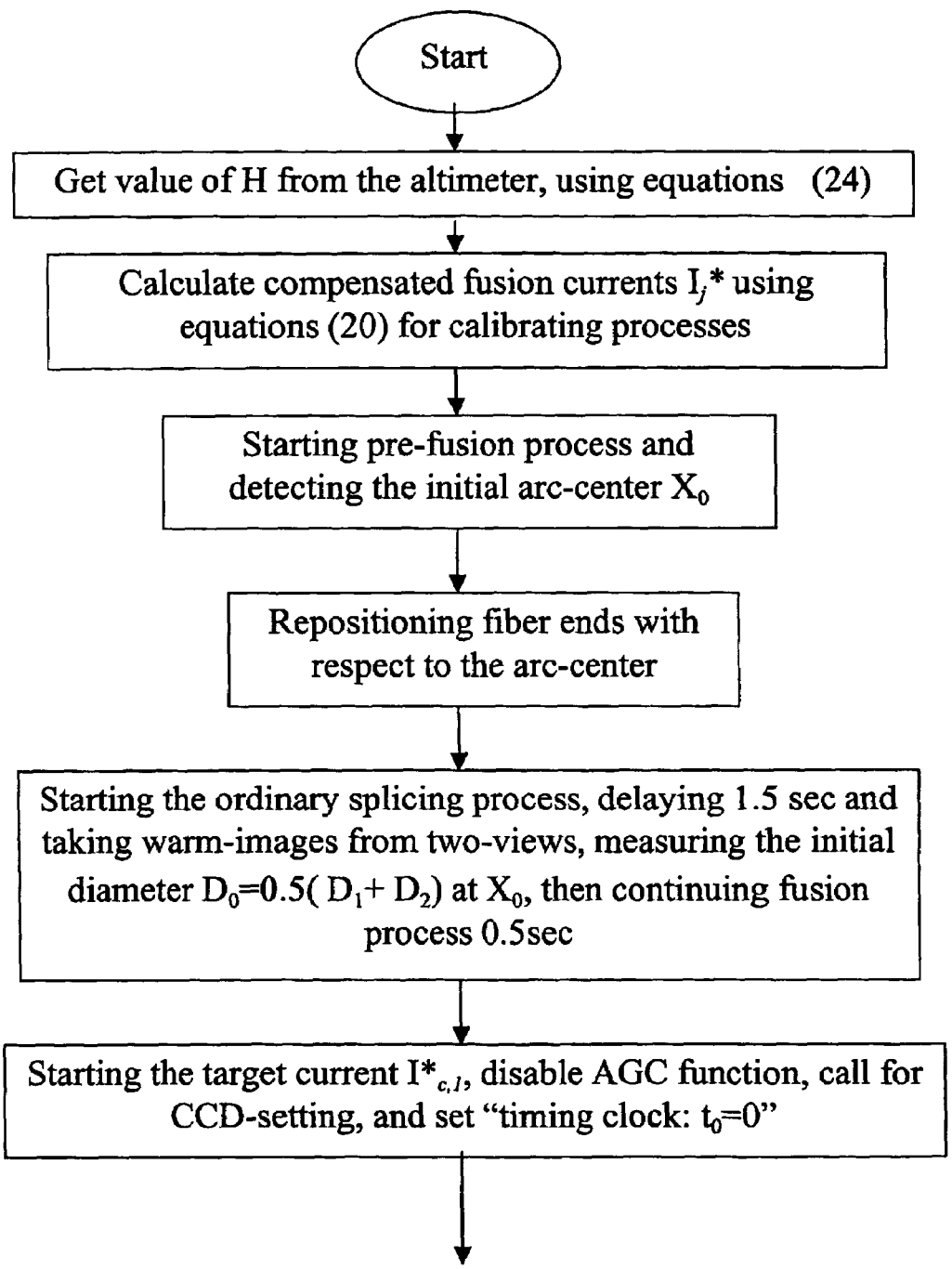
FIG. 9a-9b disclose a flow chart for fusion current calibration.
Figure 9B:
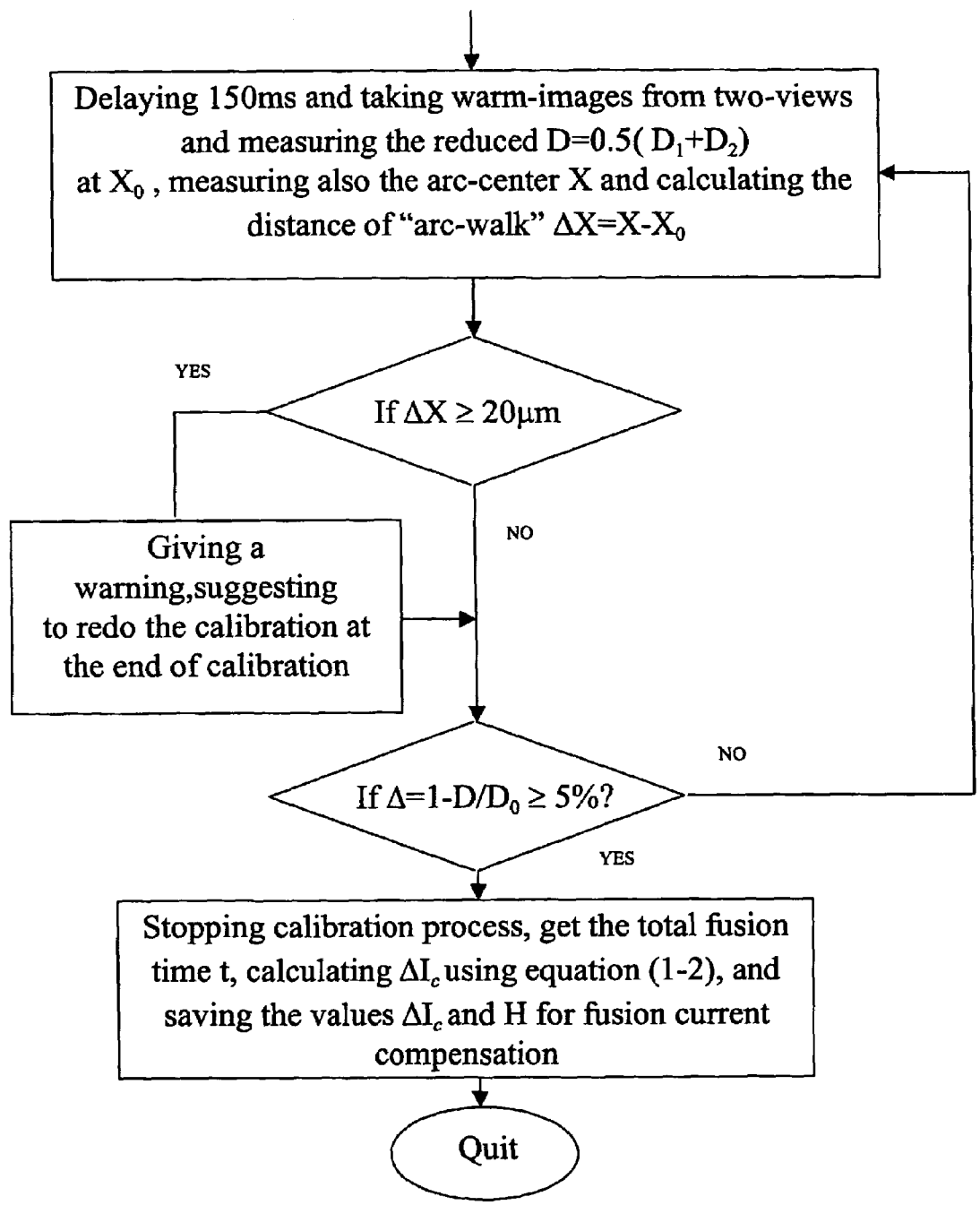

According to the discussion above, a process of "arc-check" for fusion temperature calibration is developed and implemented in Ericsson FSU15 splicers. The calibrating processes are presented in the program flow chart shown in FIG. 9a & FIG. 9b.

Figure 10:
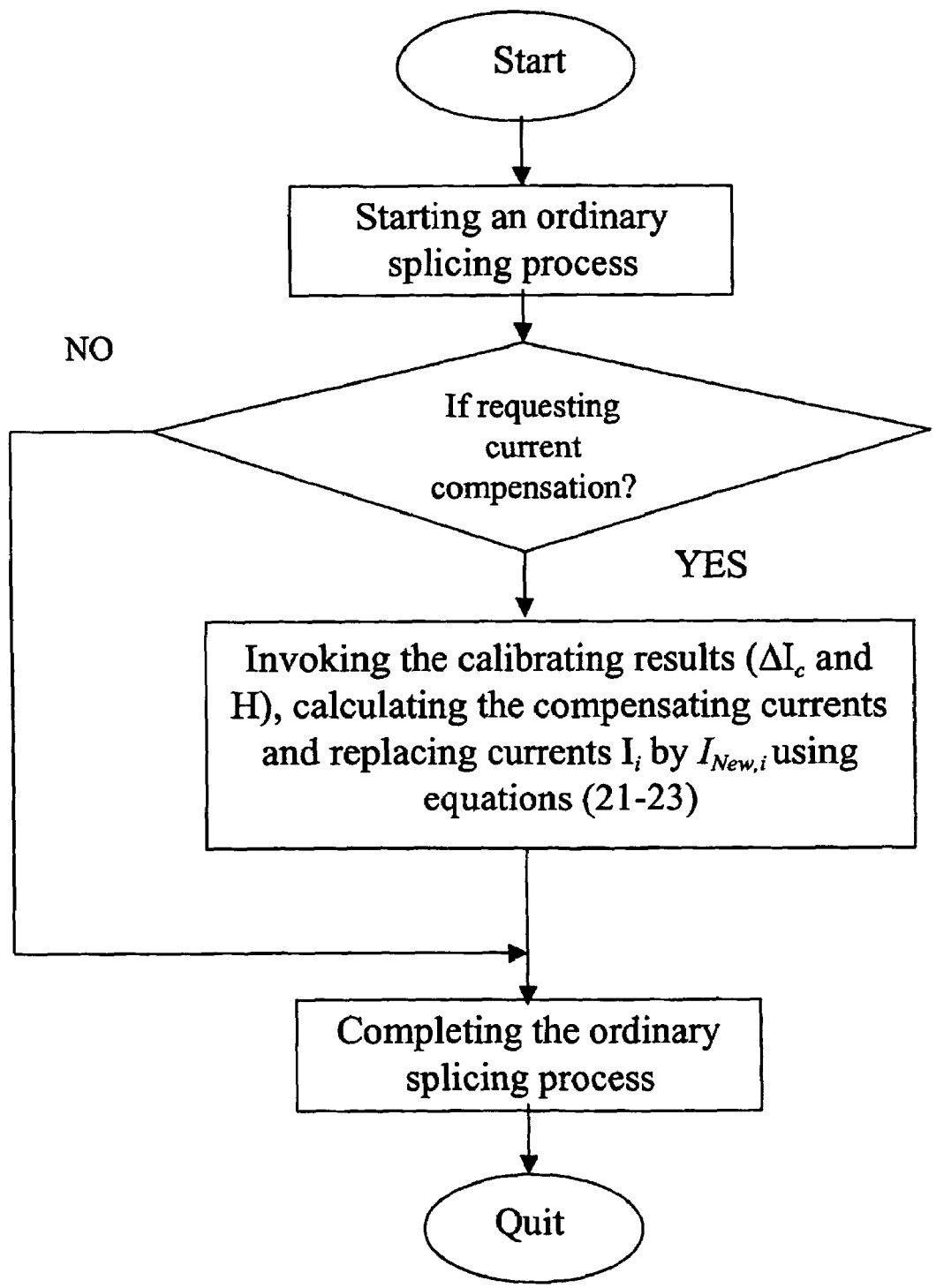
FIG. 10 discloses a flow chart for fusion current compensation.

To recover the optimal fusion temperature, the calibrating result $\Delta I_c$ and the altitude H are automatically invoked to compensate fusion currents in various fusion processes. The working principle is shown by the program flow chart in FIG. 10.

The invention is of course not limited to the above described and in the drawings shown embodiments but can be modified within the scope of the enclosed claims.

The invention claimed is:

1. A method for splicing optical fibers, said method including a step for calibrating fusion temperature in an optical fiber splicing device, wherein the relative change of fusion temperature due to significant changes of operative environment as well as electrode conditions is determined based upon measuring the amount of fusion time spent on reaching a pre-determined reduction of cladding diameter of a warm-fiber that is heated by an electrical arc using the pre-calibrated fusion current derived by an altimeter's model, said step for calibrating fusion temperature comprising the steps of:

placing two optical fibers having their end regions aligned with each other and their end surfaces in close contact with each other;

adjusting the fusion currents $I^*_i$ based on measuring the altitude with help of an altimeter, by using an equation $I^*_i = h_1 I_i + (h_2 H + h_3 I_i + h_4)^2 + h_5$;

starting the electrical arc with a pre-fusion current to clean the optical fibers and detecting an initial position of an arc-center ($X_0$);

repositioning the fiber ends with respect to the arc center ($X_0$);

starting the electric arc with a main fusion current and heating an abutted point of two optical fibers and connecting them together to give a splice;

measuring the initial cladding diameter of the warm-fiber, replacing the main fusion current with a target current ($I_{c,1}$), estimating a corresponding time ($t_{c,1}$) using an equation 1 ($t = c_1 e^{-c_2 I}$) and starting the calibration process;

continually heating the abutted point with the target current ($I_{c,1}$) and measuring the reduction of cladding diameter of warm-fibre until said diameter reaches a predetermined threshold value;

stopping the electrical arc, calculating a total fusion time ($t_2$) spent on the calibrating process and deriving a corresponding current ($I_{c,2}$) using the equation $t = c_1 e^{-c_2 I}$;

calculating an amount of fusion current needed for compensation $\Delta I_c$ ($\Delta I_c = I_{c,1} - I_{c,2}$);

calculating correction factors $\delta_i$ ($\delta_i = 1 - 0.5(I_{c,1} - I_i)/I_{c,1}$) for compensating current difference between the target current used in the calibrating process and currents used in various splicing processes;

calculating new currents $I_{NEW,i}$ ($I_{NEW,i} = I^*_i + \delta_i \Delta I_c$) needed for replacing values of expected fusion currents in various splicing processing; and, splicing one or more optical fibers using said new currents.

2. The method recited in claim 1, further comprising the steps of:

measuring arc intensity distribution by observing thermal light emission from air-discharge in the fusion area;

estimating a position of the arc-center ($X_c$) by observing spatial movement of the arc during calibration;

calculating arc-walk ($\Delta X = X_c - X_0$) during calibration; and, generating a warning signal if the arc-walk exceeds a predetermined value.

3. The method recited in claim 1, said altimeter comprising a barometric sensor, wherein the relation between the estimated altitude and the measured pressure can be expressed by $P = b_1(1 - b_2 H)^{b_3} + b_4$.

4. The method recited in claim 1, wherein the corresponding diameter of warm-fiber is calculated as an average of at least two warm-images taken from different angles of the heating area.

5. The method recited in claim 4, said method further comprising the steps of:

starting the electric arc with the target current;

saturating a CCD-camera by disabling an automatic gain control (AGC) function and using pre-defined CCD-settings;

taking images of warm-fiber from two perpendicular directions and extracting the intensity profiles; and, taking a first derivative of the intensity profiles and deriving the diameter of warm-fiber by using an average value obtained from two perpendicular directions of warm-images.

* * * * *